(No Model.)
W. C. MOODY.
FRUIT JAR.
No. 324,036. Patented Aug. 11, 1885.
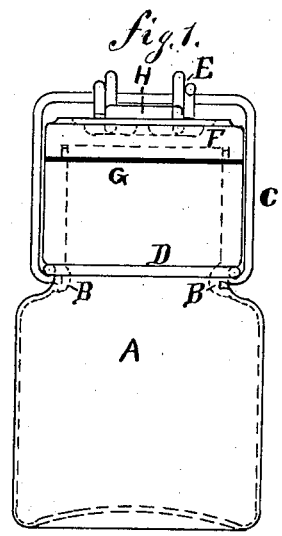
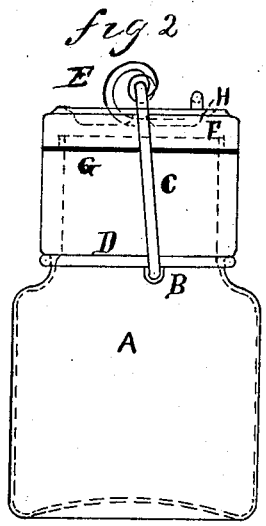
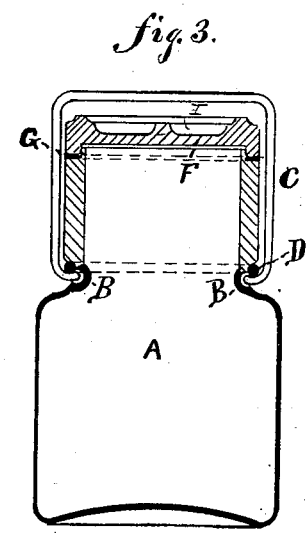
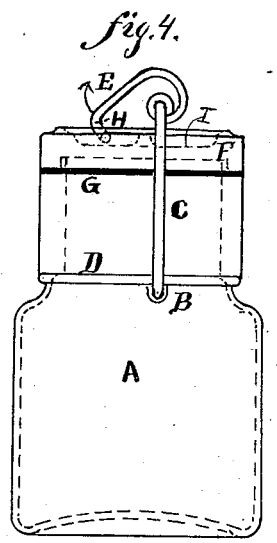
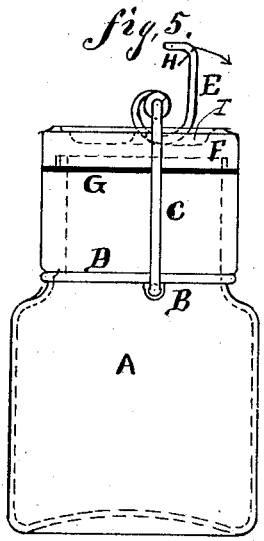
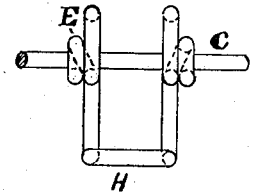
Witnesses:
Thomas Hammond
John M Curtis
Inventor.
William C. Moody
per G. L. Pierce
Attor.
N. PETERS, Photo-Lithographer, Washington, D. C.

UNITED STATES PATENT OFFICE.

WILLIAM C. MOODY, OF OAKLAND, CALIFORNIA.

FRUIT-JAR.

SPECIFICATION forming part of Letters Patent No. 324,036, dated August 11, 1885.

Application filed December 12, 1884. (No model.)

*To all whom it may concern:*

Be it known that I, WILLIAM C. MOODY, a citizen of the United States, residing at Oakland, in the county of Alameda and State of California, have invented a new and useful Improvement in Fruit-Jars, of which this, with the accompanying drawings, is a specification.

The object of my invention is to produce a fruit-jar fastener that cannot be easily unlocked by any sudden jar, and when unlocked will remain attached to the jar, and so arranged that when locked the points of the bail will not come in contact with the glass of which the jar is made. How this is accomplished is clearly illustrated in the accompanying drawings, in which—

Figure 1 is an elevation showing what I will call the "front" of a fruit-jar and clamp; Fig. 2, the side view of same; Fig. 3, a vertical section showing the spring-bail and the means of attaching the same to the jar. Fig. 4 is a side view showing the rocker-cam in the position it occupies when the bail is unlocked preparatory to swinging the same from over the cover. Fig. 5 shows the bail and rocker-cam when the bail is in position to be locked, as Figs. 1 and 2; and Fig. 6 is a plan of rocker-cam, (enlarged.)

Similar letters refer to like parts throughout the several views.

A is a fruit-jar having in its opposite sides indentations or pockets B, to allow the points of the bail C to enter sufficiently to prevent it from falling off when loose. Above these indentations and around the neck of the jar is securely twisted a wire band, D, under which the bail hooks. This band receives all the strain of the bail when locked, and prevents any force or wear whatever upon the glass pockets B, which would in a short time fracture and ruin the jar, the sole object of these pockets being to retain the bail when unlocked and swung to one side. It will be observed that these indentations or pockets are not in the center of the jar, but to one side of it. The object of this is to be hereinafter explained.

Swinging freely on the bail C is a double rocker-cam, E, a plan of which is shown in Fig. 6. This cam, as is also the bail, is to be made of wire. The object to be attained by the use of a double cam is, that the force against the bail, when locking, is brought nearer the perpendicular portions of the bail, and consequently a greater force can be applied without springing the bail than if it were applied in the center, and also the reaction of the bail is brought against two places on the glass cover F, which is pressed against and forms an air-tight joint with the elastic gasket G and the jar. The glass cover is recessed at I on the top side, to allow projection H of the cam a shoulder on the cover against which to press, and thereby prevent the unlocking of the bail by any sudden jar.

We will now suppose the bail to be swung to one side, and proceed to close the jar. The gasket and cover being placed in position, the bail, with the cam attached, is swung over the cover, as shown in Fig. 4, the bail being vertical, and then the cam is brought over to the position shown in Fig. 5. Now, it is evident that by forcing the cam over and at the same time forward it will be forced into the position shown in Figs. 1 and 2, with the upper part of the bail over the center of the cover, while the lower ends are at one side, thereby exerting a force not only downward but also forward, forcing the end H of the cam against the side of the recess in the cover and causing a most powerful and secure clamping device. At the same time every part, save the gasket and cover, is attached to the jar and cannot be lost.

Having now illustrated and described my invention, what I deem new, and desire to secure by Letters Patent of the United States is—

1. A fruit-jar having indentations or pockets B on one side of the center and protected by the metallic band D, so arranged as to prevent the hooks of the bail from coming contact with the glass sides of the pockets, by said band receiving and sustaining the whole force of the bail when locked, substantially set forth.

2. A fruit-jar having indentations or pockets B on one side of the center, the metallic band D, the bail C, and double rocker-cam having the projection H, in combination with a cover having a recess, I, so formed as to present a shoulder against which the projection H on the cam will press when locked, substantially as described.

WILLIAM C. MOODY.

Witnesses:
GEO. T. KNOX,
EDWD. CHATTIN.